United States Patent Office 3,443,996
Patented May 13, 1969

3,443,996
APPARATUS FOR CONTINUOUS MANUFACTURE OF ELECTRODES FOR SINTERED PLATE ACCUMULATOR CELLS
Sven Uno Falk, Erik Jönsson, and Sven Gunnar Söredal, Oskarshamn, Sweden, assignors to Svenska Ackumulator Aktiebolaget Jungner, Oskarshamn, Sweden, a corporation of Sweden
Filed Apr. 29, 1966, Ser. No. 546,359
Int. Cl. H01m 35/30, 35/28
U.S. Cl. 136—82                    6 Claims

ABSTRACT OF THE DISCLOSURE

An apparatus for the continuous manufacture of electrodes for sintered plate accumulator cells is disclosed. The apparatus consists of a means for sintering a metal powder on a metal substrate, a plurality of narrow curved container means for impregnating, washing, drying and precipitating a solution of a salt of an active metal on the band, means for electrolyzing the active metal on the band, and rollers to feed the band to and remove it from the plurality of curved containers. When producing negative electrodes cathodizers replace the precipitation means, the cathodizer being a rotating or stationary cagelike drum having insulating rods or rollers.

---

The object of this invention is a processing plant for the continuous manufacture of electrodes for sintered plate alkaline accumulators. The electrode material is in the form of a band continuously running through the plant, which comprises several units for the various steps in the process. In most of them the band is treated with solutions, rinsed with water or dried with air. A common feature of all these units is that they contain a very small quantity of the active agents. The solutions are fed to the units at a rate not much greater than that necessary for the particular process. This is realized by making the unit treatment vessels of a narrow curved shape rather closely following the shape of a freely hanging band. This has been done in order to avoid building up contaminations in the vessels and to save material. The processing plant may include the following steps. A slurry of nickel powder in a colloidal solution is applied on a substrate in the form of a band by any appropriate method and preferably on both sides. The substrate may be in the form of a sheet, which may be perforated, a gauze or grid or expanded metal of steel or nickel or nickel plated steel or the like. The nickel powder may be made by decomposing nickel carbonyl, by electrolytic deposition, by reduction of a nickel compound or by any other method. The colloidal solution may be a cellulosic derivate such as methyl cellulose, CMC or dextrin or gelatin dissolved in water. The preferred embodiment electrode is a substrate of nickel-plated steel, perforated except for a strip at each edge and possibly a few narrow strips distributed over the width of the band to facilitate cutting of it into plaques narrower than the band. The band is then covered on both sides with a slurry of carbonyl nickel powder in aqueous CMC solution, except for the unperforated strips. This structure is then sintered at, e.g., 900° C. for about 10 minutes in a reducing atmosphere such as a hydrogen-nitrogen mixture. The sintered band is subsequently impregnated with active material in devices which will now be described.

Figure 1:
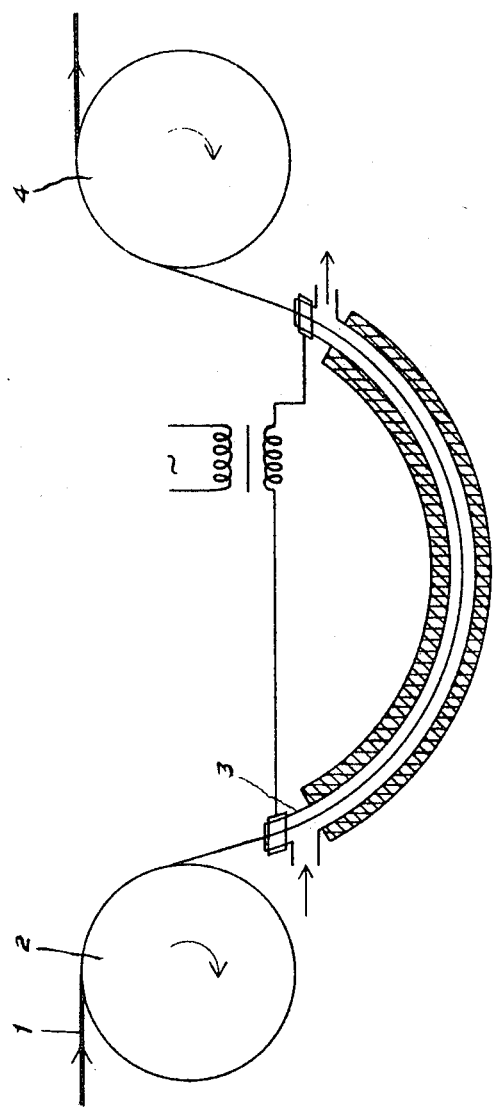
Figure 2:
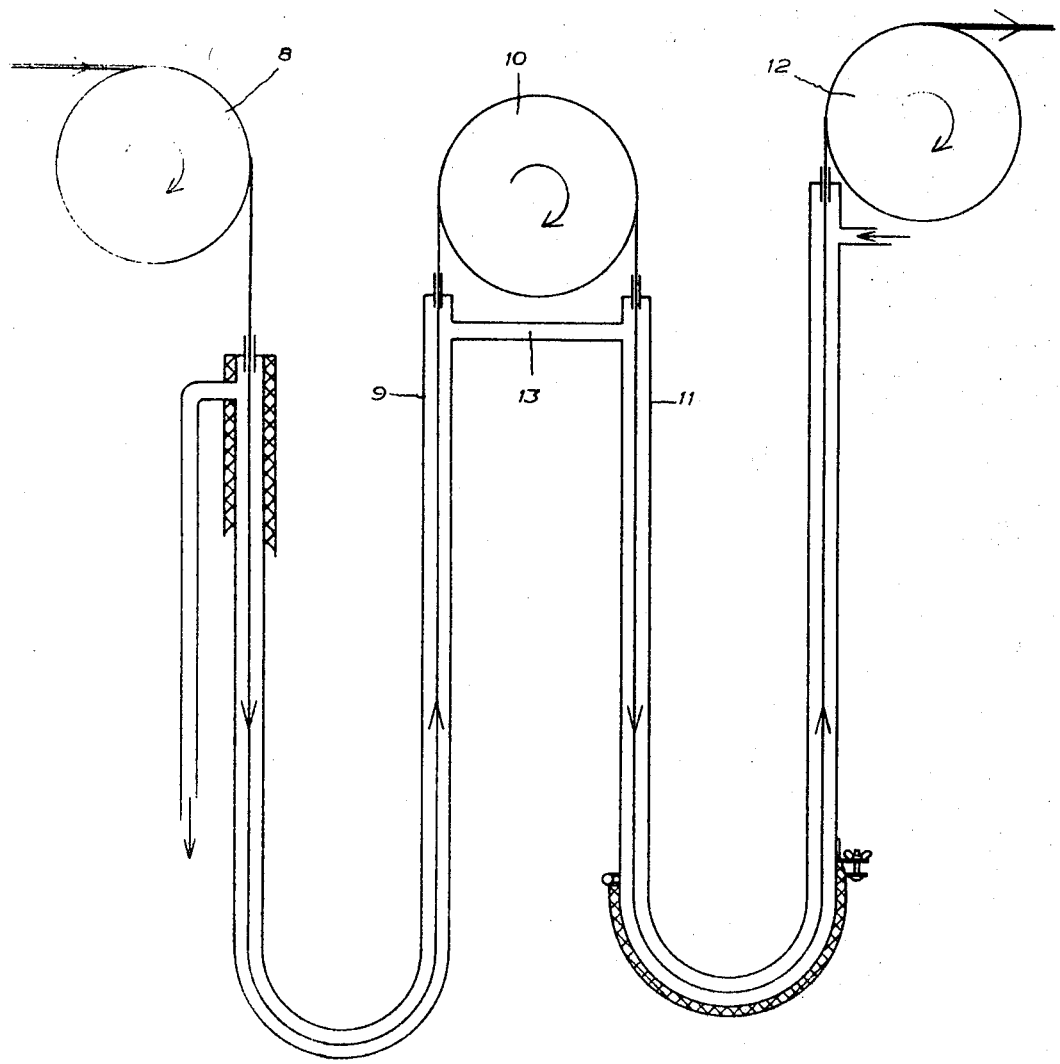
Figure 3:
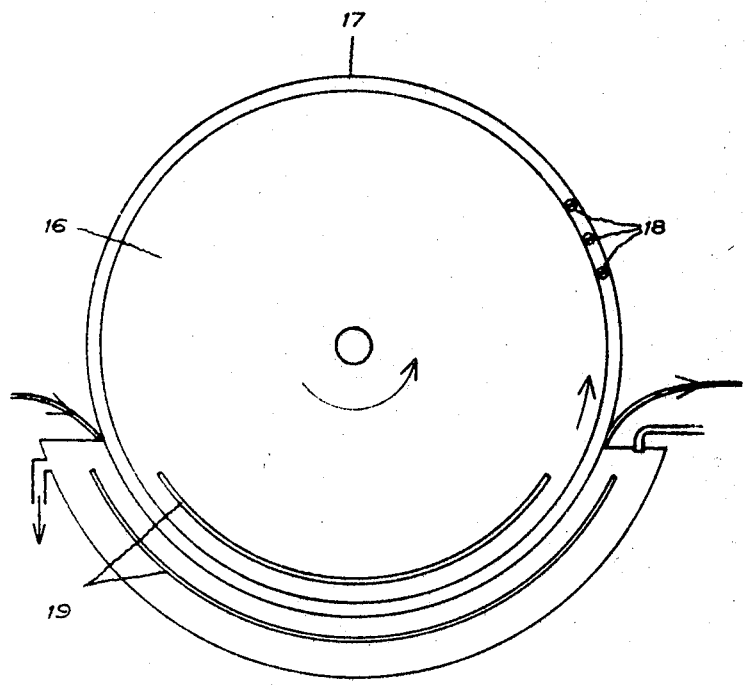
Figure 4:
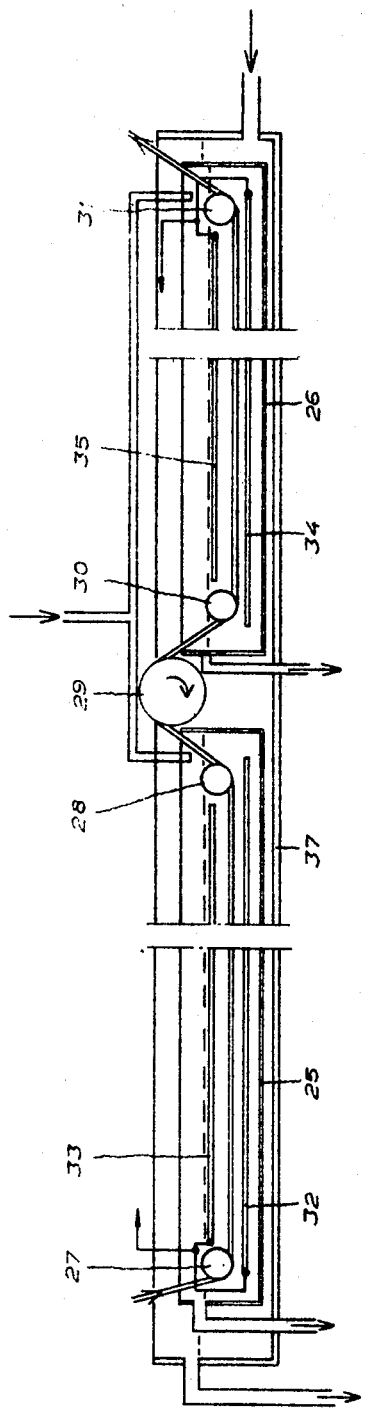
Figure 5:
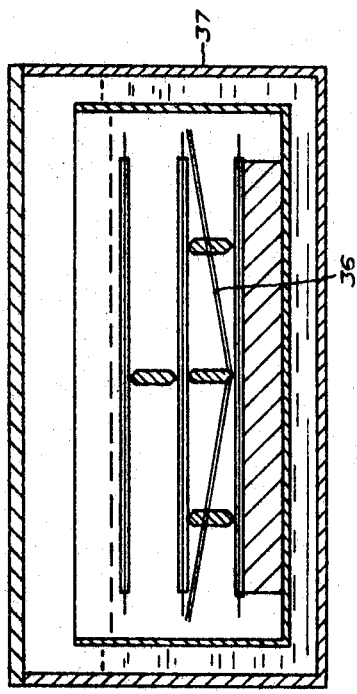

To facilitate understanding of the working principles reference is made to the accompanying drawings, showing:

FIG. 1 an "impregnator,"
FIG. 2 a device for precipitating, drying and rinsing,
FIG. 3 a drum type cathodizer,
FIGS. 4–5 a forming device for charge and discharge of the impregnated band, called a twin electrolyzer.

In FIGURE 1 a band 1 is bent over a roller 2 and runs into a narrow curved vessel 3 containing a solution of a salt of an active metal. It may be heated to enable the use of very concentrated solutions. After passing the container 3 the band is bent over another roller 4.

The amount of impregnating solution (e.g., Ni-nitrate and Cd-nitrate, respectively), continuously fed to the impregnator is only very slightly in excess of the amount actually absorbed by the electrode ribbon. The curved impregnating vessel is designed to have the smallest volume possible in order to get a short "time constant" for the impregnating bath composition. This has been done to avoid any difficulties because of, for instance, selective absorption. To keep the impregnating solution temperature up, a heating arrangement is included. The number of impregnations necessary of course depends on the pickup desired.

The device according to FIGURE 2 may be used for precipitating the active metal, for rinsing the band, or for drying it. The band first passes a roller 8 and runs into a narrow curved U-shaped flat tube 9 which is heat insulated and provided with some heating device if necessary. After having passed this tube the band runs over a roller 10 into another U-shaped tube 11 and over a third roller 12. When used for rinsing or drying, pure deionized water or hot air is fed to the output (right hand) leg of the tube 11, flows through this and an interconnection tube 13 to the tube 9 and out from this at its input (left hand) leg. When used for precipitating it is most convenient to feed the tube 9 through its input leg and the tube 11 through its output leg with alkaline solution such as potassium hydroxide. The solution then leaves the tubes through openings in the interconnection tube 13. This is done in order to treat the electrode band with the cleanest possible KOH at the output end and with reasonably clean KOH at the input end to assure precipitation of the maximum amount of hydrate within the pores. This device is preferably used for nickel hydroxide for positive electrodes.

The device according to FIGURE 3 is preferably used for precipitating cadmium hydroxide as negative active material while electrolyzing cathodically. The band is rolled under a rotating or stationary cagelike drum 16, the edges of which 17 are of metal in contact with the unperforated, uncovered edges of the band. The middle part of the drum may consist of rods or rollers of insulating material 18. The radial distance between the edges 17 and the rods or rollers 18 is about equal to the thickness of the sinter layer on each side of the support. Inside and outside the drum counter electrodes 19 are arranged. The edges of the drum are connected to a slip ring arrangement (not shown) if the drum is rotating. In such case it may have a rim velocity slightly different from the feed speed of the band in order to improve electrical contact with it.

The "twin electrolyzer" shown in FIGURES 4 and 5 comprises two compartments consisting of flat containers 25 and 26, through which the band is fed by means of rollers 27–31. Each container is equipped with two counter electrodes, e.g., of nickel sheets 32–35. Between the band and the bottom counter electrodes 32 and 34, gas deflectors 36 (FIG. 5) of microporous insulating material are arranged in order to prevent the gas bubbles, developed at the counter electrodes 32 and 34, to accumulate under the band. The containers are fed with pure potassium or sodium hydroxide solution at the output end and the excess solution is removed at the input end of each container. Instead of two containers two compartments may be arranged in one container which may be parted by means of a wall of insulating material, the band passing through a slot in the wall. The polarizing current is fed in such a direction that the band is charged in the first compartment and discharged in the second, i.e., a band for positive electrodes is electrolyzed anodically in the first and cathodically in the second compartment, and vice versa for negative electrodes. The current is fed to the counter electrodes at the input end in the first compartment and from there to the band, then flows through the band to the second compartment and on to the counter electrodes and out from the output end. It is thus unnecessary to make contact to the band. The resistance along the counter electrodes may be selected so that the charge and discharge current density in the bath is approximately constant along the band corresponding to a uniform potential difference between band and counter electrodes. In order to improve the current density constancy the counter electrodes may be fed in several points or split up in several parts with separate feeding. The current should also be stabilized. The advantage of constant current (constant with time) and constant current density (constant along the band) is that it is then possible to measure the capacity both on charge and discharge by simply observing the point where gassing occurs.

The voltage drop in the band and the counter electrodes and thus the electric losses and the heat generation are rather high. The twin electrolyzer may therefore include a cooling mantle 37.

The entire equipment may consist of the following parts.

For positive electrodes:

(1) Sintering device (not shown)
(2) Impregnator (FIG. 1)
(3) Dryer (FIG. 2)
(4) Impregnator (FIG. 1)
(5) Dryer (FIG. 2)
(6) Precipitator (FIG. 2)
(7) Washer (FIG. 2)
(8) Dryer (FIG. 2)
(9–20) For two additional impregnation cycles, as required, two additional sets of the equipment listed above are required except that the washing (7) and drying (8) may be omitted in the final impregnating cycle
(21–23.3) Twin electrolyzers (FIG. 4)
(24) Washer (FIG. 2)
(25) Dryer (FIG. 2)

For negative electrodes:

(1) Sintering device (not shown)
(2) Impregnator (FIG. 1)
(3) Cathodizer (FIG. 3)
(4) Washer (FIG. 2)
(5) Dryer (FIG. 2)
(6–23) Units 1–5 duplicated the required number of, for instance 5, times to get the desired negative pickup washing (4) and drying (5) may be omitted in final stage
(24–26) 3 twin electrolyzers (FIG. 4)
(27) Washer (FIG. 2)
(28) Dryer (FIG. 2)

The plant may include units for all these operations to be made consecutively or it may be split up in smaller parts and the band cut and rolled onto drums between the various stages; the ultimate arrangement depending upon the production wanted and other local circumstances, such as space available, reverse considerations etc.

The entire plant should be driven synchronously, e.g., from one motor with clutches and gears for every unit. Between the units it might sometimes be desirable to include spring-loaded band stretchers.

What we claim is:

1. An apparatus for the continuous production of a band for positive electrodes for sintered plate accumulator cells comprising:
   (a) means for forming a band of sintered metal powder on a metal substrate,
   (b) a plurality of narrow curved container means for impregnating, washing, drying and precipitating a solution of a salt of an active metal on said band,
   (c) means for electrolyzing said active metal on said band, and
   (d) means for feeding the band to and removing the band from said plurality of means in (b) comprising a plurality of rollers, said narrow curved impregnating means comprising a means for feeding said solution to and removing said solution from the impregnating means, and means for heating said impregnating means, said electrolyzing means comprising two compartments consisting of flat containers wherein said band is fed by means of rollers and electrolyzed by two counter electrodes disposed on opposite sides of said band and microporous insulating material gas deflectors being disposed between said band and the lower counter electrode in each container, each of said containers having inlet means for a solution of alkali metal hydroxide and an output for excess solution, polarizing current being fed to said counter electrodes so that the band is electrolyzed anodically in the first of said electrolyzers and cathodically in the second of said electrolyzers, the current passing to the band in the first compartment, through the band to the second compartment and to the counter electrodes in the second compartment.

2. The apparatus of claim 1 wherein said washing means comprises a pair of U-shaped flat tubes being connected by a separate tube and provided with means for passing deionized water countercurrently to the band within both of said U-shaped tubes.

3. The apparatus of claim 1 wherein said drying means comprises two U-shaped tubes interconnected by a separates tube and provided with a means for passing hot air countercurrently to the band within both of said U-shaped tubes.

4. An apparatus for the continuous production of a band for negative electrodes for sintered plate accumulator cells comprising:
   (a) means for forming a band of sintered metal powder on a metal substrate,
   (b) a plurality of narrow curved container means for impregnating, washing, and drying a solution of a salt of an active metal on said band,
   (c) at least one means for cathodizing said band,
   (d) means for electrolyzing said active metal on said band, and
   (e) means for feeding the band to and removing the band from said plurality of means in (b) comprising a plurality of rollers, said narrow curved impregnating means comprising a means for feeding a solution of alkali metal hydroxide counter-currently to said band in said impregnating means, and means for heating said impregnating means, said cathodizing means comprising a cage-like drum having metal edges in contact with unperforated uncovered edges of said band and insulating means between the edges of said drum, counter electrodes being disposed inside and outside said drum, means for contacting negative active material with said band and said electrodes, and means for feeding and removing said negative active material from said cathodizer, the electrolyzer comprising two compartments through which said band is fed by means of rollers, each compartment containing counter electrodes disposed on either side of said band, and microporous insulating material gas deflectors disposed between said band and the lower counter electrode in each compartment, each container having means for feeding and removing a solution of alkali metal hydroxide, and means for electrolyzing cathodically in the first of said compartments and anodically in the second of said compartments wherein current passes between said compartments in the band, and to and from said counter electrodes and band.

5. The apparatus of claim 4 wherein said washing means comprises a pair of U-shaped flat tubes being connected by a separate tube and provided with means for passing deionized water countercurrently to the band within both of said U-shaped tubes.

6. The apparatus of claim 4 wherein said drying means comprises two U-shaped tubes interconnected by a separate tube and provided with a means for passing hot air countercurrently to the band within both of said U-shaped tubes.

References Cited

UNITED STATES PATENTS

| | | | |
|---|---|---|---|
| 789,690 | 5/1905 | Goodson | 204—206 XR |
| 1,381,883 | 6/1921 | Merritt | 204—206 XR |
| 2,477,808 | 8/1949 | Jones | 204—211 |
| 2,528,266 | 10/1950 | Daily et al. | 136—82 |
| 2,541,275 | 2/1951 | Odier | 204—211 |
| 2,560,534 | 7/1951 | Adler | 204—28 |
| 2,819,962 | 1/1958 | Salauze | 75—208 |
| 2,868,702 | 1/1959 | Brennan | 204—28 |
| 2,955,146 | 10/1960 | Vogt | 136—61 |
| 3,072,497 | 1/1963 | Goglielmo | 117—115 XR |

FOREIGN PATENTS 1,127,611   1956   France.

JOHN H. MACK, *Primary Examiner.*

W. B. VAN SISE, *Assistant Examiner.*

U.S. Cl. X.R.

118—419, 429; 136—34, 76; 204—28, 206